United States Patent
Weeks, Jr. et al.

(10) Patent No.: US 9,763,298 B2
(45) Date of Patent: Sep. 12, 2017

(54) VOLTAGE BALANCING CURRENT CONTROLLED LED CIRCUIT

(71) Applicant: Hubbell Incorporated, Shelton, CT (US)

(72) Inventors: T. Warren Weeks, Jr., Greenville, SC (US); Thomas N. Clawson, Boiling Springs, SC (US); Douglas M. Hamilton, Arlington Heights, IL (US)

(73) Assignee: Hubbell Incorporated, Shelton, CT (US)

( * ) Notice: Subject to any disclaimer, the term of this patent is extended or adjusted under 35 U.S.C. 154(b) by 44 days.

(21) Appl. No.: 14/667,023

(22) Filed: Mar. 24, 2015

(65) Prior Publication Data

US 2016/0286615 A1    Sep. 29, 2016

(51) Int. Cl.
*H05B 33/08* (2006.01)

(52) U.S. Cl.
CPC ..... *H05B 33/0827* (2013.01); *H05B 33/0815* (2013.01); *H05B 33/0869* (2013.01); *Y02B 20/347* (2013.01)

(58) Field of Classification Search
None
See application file for complete search history.

(56) References Cited

U.S. PATENT DOCUMENTS

2014/0125242 A1*  5/2014  Kang ............... H05B 33/0812
                                                     315/201
2014/0361697 A1* 12/2014  Miskin ............ H05B 33/0821
                                                     315/192

OTHER PUBLICATIONS

Hubbell Industrial Lighting brochure, "NutriLed LED Horticultural Light," Jan. 2015—9 pages.

* cited by examiner

*Primary Examiner* — Jany Richardson
(74) *Attorney, Agent, or Firm* — Dority & Manning, P.A.

(57) ABSTRACT

Systems and methods for balancing voltage in LED circuits are provided. An LED circuit can have a plurality of LED strings coupled in parallel with one another. Each LED string can include a plurality of LED devices coupled in series. The LED strings can receive a driver current from a driver circuit. According to example embodiments of the present disclosure, at least one of the plurality of LED strings can include a constant current regulator circuit coupled in series with the LED string. The constant current regulator circuit can provide a constant current through the LED string. The balance or remainder of the driver current can be provided to the other LED string. The constant current regulator circuit can provide for voltage balancing among the plurality of parallel LED strings.

19 Claims, 8 Drawing Sheets

VOLTAGE BALANCING CURRENT CONTROLLED LED CIRCUIT

FIELD

The present disclosure relates generally to light emitting diode (LED) circuits.

BACKGROUND

LED lighting systems can include one or more LED devices that become illuminated as a result of the movement of electrons through a semiconductor material. LED devices are becoming increasingly used in many lighting applications and have been integrated into a variety of products, such as light fixtures, indicator lights, flashlights, and other products. LED lighting systems can provide increased energy efficiency, life and durability, can produce less heat, and can provide other advantages relative to traditional incandescent and fluorescent lighting systems. Moreover, the efficiency of LED lighting systems has increased such that higher power can be provided at lower cost to the consumer.

Certain LED lighting units can include multiple different types of LEDs. For instance, an LED lighting unit can include a first string of LEDs associated with a first color (e.g. wavelength) or intensity and a second string of LEDs associated with a second color or intensity. For instance, LED lighting units used, for instance, for horticultural applications can include one or more LED strings for providing a red color light (e.g. wavelengths in the range of about 600 nm to about 750 nm) as well as one or more LED strings providing a blue color light (e.g. wavelengths in the range of about 400 nm to about 500 nm). These LED strings can be powered by a driver current from a driver circuit. In certain applications, the LED strings can be coupled in parallel, for instance, to accommodate a higher powered driver circuit. Given the different output requirements and turn-on voltage requirements of each of the LED strings, coupling the LED strings in parallel can result in a voltage imbalance in the voltage demands for the plurality of the LED strings. And since the turn-on voltage (e.g. forward voltage) can be inversely proportional to the wavelength of the LED semiconductor material, this imbalance can be especially pronounced for parallel strings of blue and red LEDs. Also, LEDs of different semiconductor materials and resulting wavelengths usually have unequal maximum drive current ratings which can necessitate that each parallel LED string be driven at a different drive current.

SUMMARY

Aspects and advantages of embodiments of the present disclosure will be set forth in part in the following description, or may be learned from the description, or may be learned through practice of the embodiments.

One example aspect of the present disclosure is directed to a light emitting diode (LED) circuit. The LED circuit can include a first LED string having one or more first LED devices and a second LED string having one or more second LED devices. The first LED string and the second LED string can be coupled in parallel. The first LED string can include a constant current regulator circuit configured to provide a constant current to the first LED string such that a balance current is provided to the second LED string. The balance current is at least a portion of the driver current remaining after the constant current is provided to the first LED string.

Another example aspect of the present disclosure is directed to a method for providing current to a plurality of light emitting diode (LED) devices. The method includes generating a driver current at a driver circuit and providing the driver current to a plurality of LED strings coupled in parallel. Each of the plurality of LED strings can include a plurality of LED devices coupled in series. The method can further include providing a constant current through one or more of the plurality of LED strings using one or more constant current regulator circuits. The method further includes providing a balance current to one of the plurality of LED strings. The balance current is at least a portion of the driver current remaining after the constant current is provided to the one or more of the plurality of LED strings.

Yet another example aspect of the present disclosure is directed to a light emitting diode (LED) system. The LED system includes a driver circuit configured to provide a driver current. The LED system further includes a first LED string having one or more first LED devices and a second LED string having one or more second LED devices. The first LED string and the second LED string are coupled in parallel. The first LED devices can be configured to provide light at a different color or intensity relative to the second LED devices such that the plurality of second LED devices of the second LED string are associated with a greater voltage demand relative to the plurality of LED devices of the first LED string. The first LED string includes means for balancing a voltage associated with the first LED string and the second LED string.

Other example aspects of the present disclosure are directed to systems, methods, apparatus, circuits, and electronic devices associated with LED circuits and/or LED systems.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
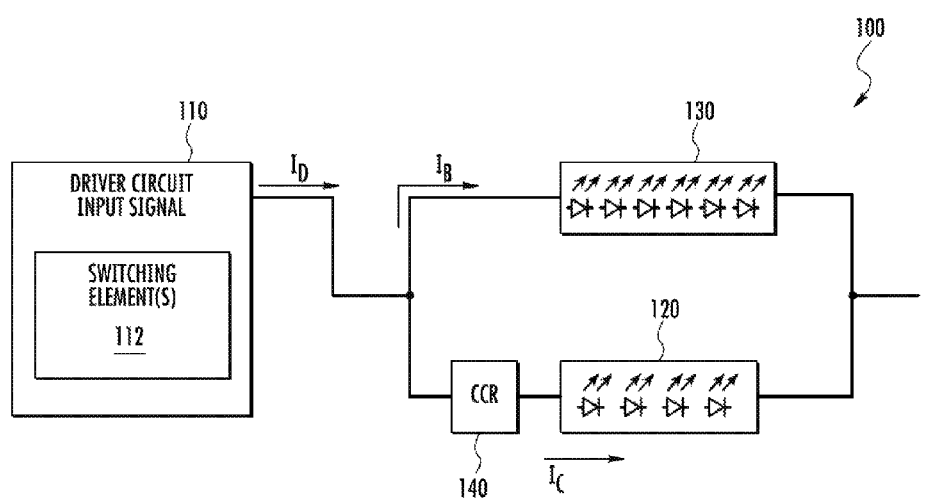
FIG. 1 depicts an example LED circuit according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to light emitting diode (LED) systems having a plurality of LED devices. As used herein, a lighting system can include, but is not limited to, one or more of a lighting circuit, light engine, one or more luminaires, one or more lighting fixtures, one or more lighting units, a plurality of lighting devices arranged in an environment, a combination of any of the foregoing, or other lighting system.

LED devices can be configured to emit electromagnetic energy, for instance, as a result of electrons moving through a semiconductor material. The LED devices discussed herein can be configured to emit electromagnetic energy at a variety of ranges of wavelengths including across both visible and non-visible portions of the electromagnetic spectrum. As used herein, an LED device configured to emit light refers to an LED device configured to emit visible light, ultraviolet light, infrared light, and other light or electromagnetic energy in the electromagnetic spectrum.

According to example aspects of the present disclosure, an LED circuit can have a plurality LED strings coupled in parallel with one another. Each LED string can include one or more LED devices. For instance, an LED string can include a single LED device, a plurality of LED devices coupled in series, a plurality of LED devices coupled in series with a circuit coupled in the middle of the plurality of LED devices, a plurality of substrings coupled in parallel with each substring including one or more LED devices, and other arrangements of LED devices.

The LED strings can receive a driver current from a driver circuit (e.g. a dimmable driver circuit). According to example embodiments of the present disclosure, at least one of the plurality of LED strings can include a constant current regulator circuit coupled in series with the LED string. The constant current regulator circuit can provide a constant current through the LED string. The balance or remainder of the driver current can be provided to the other LED string.

In some implementations, the constant current regulator circuit can provide voltage balancing among the plurality of parallel LED strings. More particularly, an LED circuit can include a plurality of LED strings coupled in parallel, for instance, to accommodate an increased driver current from a higher power driver circuit. Each of the LED strings can be associated with differing voltage demands. More particularly, an LED string can have voltage demand based at least in part on the sum or aggregate of the individual voltage thresholds (e.g. turn-on voltages) for illuminating each of the LED devices coupled in series in the LED string. In certain implementations, each of the LED strings can be associated with a different voltage demand such that some LED strings demand greater voltage for operation of the LED string relative to the other LED strings. For instance, in one example, a first LED string can include a plurality of first LED devices having a first turn-on voltage (e.g. about 3.0 V) while a second LED string can include a plurality of second LED devices having a second turn-on voltage that is different from the first turn-on voltage (e.g. 2.1 V). In addition, the first LED string can include a different number of LED devices relative to the second LED string. As a result, the first LED string can require a greater or lesser voltage demand for illuminating the first LED string relative to the second LED string.

Coupling a plurality of LED strings having differing voltage demands in parallel can result in a voltage imbalance between the plurality of LED strings. More particularly, an overvoltage can be applied to an LED string having a smaller voltage demand relative to the other LED strings when coupling the LED strings in parallel. To balance the difference in voltage demands between the LED strings, a constant current regulator circuit can be coupled in series with at least one of the LED strings. For instance, a constant current regulator circuit can be coupled in an LED string having a lower voltage demand relative to the other LED strings. The constant current regulator circuit can be used to provide a constant current through the LED string while at the same time accommodating the voltage difference between the voltage demands of the LED strings.

The use of a constant current regulator circuit in conjunction with one of the plurality of LED strings according to example aspects of the present disclosure can also provide for the regulation of current through all of the LED strings by actively controlling the constant current through a only subset of the plurality of LED strings. More particularly, in an example where an LED circuit has two LED strings, a constant current regulator can be used to provide a constant current for one of the LED strings. The current through the other LED string can simply be the balance or remainder of the driver current after providing the constant current through the other LED string. In an example where an LED circuit has three LED strings, one or more constant current regulator circuits can be used to provide a constant current for two of the three LED strings. The current through the third LED string can be the balance or remainder of the driver current after providing the constant current through the other LED strings with their respective constant current regulators. In this way, the current through the all of the plurality of LED strings can be controlled without requiring active current control for each of the parallel LED strings. More particularly, the current through one of the plurality of parallel LED strings can be passively controlled through active control of the constant current through another parallel LED string using a constant current regulator circuit.

According to particular example embodiments of the present disclosure, the constant current regulator for at least one of the plurality of LED strings can be a tunable constant current regulator. A tunable constant current regulator has the ability to change the magnitude or amount of constant current provided to the LED string. A tunable constant current regulator can be used to control the amount of current provided to all of the parallel LED strings in an LED circuit by adjusting the constant current provided to at least one of the LED strings. More particularly, an adjustment in the amount of constant current provided to a first LED string can result in an adjustment to the amount of balance current available for a second LED string. In this way, a current ratio between the plurality of LED strings can be controlled using the tunable constant current regulator coupled in series with one of the LED strings.

In one particular implementation, the tunable constant current regulator circuit can include a resistor used to control the magnitude of the constant current. The magnitude of the constant current can be adjusted by changing the resistance value of the resistor. For instance, a resistor having a first resistance value can be replaced with a resistor having a second resistance value to adjust the constant current provided by the constant current regulator circuit.

In another particular implementation, the resistor can be a variable resistor. The resistance value of the variable resistor can be adjusted in a variety of manners, for instance, using a potentiometer, or other device. In particular implementations, the resistance value of the variable resistor can be adjusted based on a variable reference signal. The variable reference signal can be, for instance, a 0V to 10V signal received from an external circuit, such as a dimmer circuit, smart interface control, potentiometer, Zener diode circuit, or other device. As used herein, a 0V to 10V lighting control signal can vary from, for instance, 1V to 9V, 1V to 10V, 2V to 8V, 2V to 9V, 2V, to 10V, 1V to 11V, or other suitable range between about 0V and about 10V. Other suitable protocols can be used for the variable reference signal. For instance, the lighting control signal can be a digital addressable lighting interface (DALI) lighting control signal, digital multiplex (DMX) lighting control signal, or other control signal.

In another particular implementation, the tunable constant current regulator circuit can include one or more control devices, such as one or more microcontrollers, microprocessors, logic devices, integrated circuits, or other control devices. The control device(s) can be powered at least in part by the driver output of the driver circuit. The control device(s) can control one or more switching elements (e.g. transistors) in communication with the LED string to control the constant current supplied to the LED string. For instance, a duty cycle of the switching elements can be controlled to adjust the constant current provided to the LED string.

The control device(s) can receive as a control input a variable reference signal and can control the constant current provided to the LED string based on the variable reference signal. As discussed above, the variable reference signal can be, for instance, a 0V to 10V signal received from an external circuit, such as a dimmer circuit, smart interface control, potentiometer, Zener diode circuit, or other device. Other suitable protocols can be used for the variable reference signal, such as DALI lighting control signal, DMX lighting control signal, or other control signal.

With reference now to the Figures, example embodiments of the present disclosure will now be discussed in detail. FIG. 1 depicts an example LED lighting circuit 100 according to example embodiments of the present disclosure. The LED lighting circuit 100 includes a driver circuit 110 configured to provide a driver current $I_D$ to a first LED string 120 and a second LED string 130 coupled in parallel. The first LED string 120 and the second LED string 130 can each include a plurality of LED devices coupled in series. The LED devices can emit light as a result of electrons moving through a semiconductor material. The first LED string 120 and the second LED string 130 can be implemented on the same, or different, printed circuit board and can be associated with differing characteristics. For instance, the LED strings 120 and 130 can be associated with different colors, different color temperatures, different brightness, different lighting direction, different intensity, or other suitable characteristics.

In addition, the LED devices in each LED string 120 and 130 can be uniform or non-uniform. For instance, in some embodiments, each LED string 120 and 130 can include a plurality of different LED devices associated with different colors, different color temperatures, different brightness, different lighting direction, different intensity, or other suitable characteristics. In other embodiments, each LED string 120 and 130 can include a plurality of LED devices associated with the same color, color temperature, brightness, intensity, etc.

The driver circuit 110 can be configured to receive an input power, such as an input AC power or an input DC power, and can convert the input power to a suitable driver current $I_D$ for powering the first LED string 120 and the second LED string 130. In some embodiments, the driver circuit 110 can include various components, such as switching elements 112 (e.g., transistors) that are controlled to provide a suitable driver current $I_D$. For instance, in one embodiment, the driver circuit 110 can include one or more transistors. Gate timing commands can be provided to the one or more transistors to convert the input power to a suitable driver current $I_D$ using pulse width modulation techniques. In other instances, the driver circuit 110 may be a direct drive AC circuit with full bridge rectification wherein $I_D$ is a constant Irms current.

In some example embodiments, the driver circuit 110 can be dimmable driver circuit. For instance, the driver circuit 110 can be a line dimming driver, such as a phase-cut dimmable driver, Triac dimmer, trailing edge dimmer, or other line dimming driver. The driver current can be adjusted using the line dimming driver by controlling the input power to the dimmable driver circuit. In addition and/or in the alternative, the dimmable driver circuit 110 can receive a dimming control signal (e.g. input signal shown in FIG. 1) used to control the driver current. The dimming control signal can be provided from an external circuit, such as an external dimming circuit or sensor (e.g. an optical sensor, thermal sensor, or other sensor configured to provide feedback to the driver circuit for use by the driver circuit to adjust the driver current). The external circuit can include one or more devices, such as a smart dimming interface, a potentiometer, a Zener diode, or other device. The dimming control signal can be a 0V to 10V control signal or can be implemented using other suitable protocols, such as a DALI protocol, or a DMX protocol.

The driver circuit 110 can be configured to adjust the driver output based at least in part on the dimming control signal. For example, reducing the dimming control signal by 50% can result in a corresponding reduction in the driver current $I_D$ of about 50%. The reduction of the driver current $I_D$ for supply to the plurality of LED strings can result in the radiant flux of the plurality of LED strings being simultaneously decreased.

According to particular aspects of the present disclosure, the LED circuit 100 can include means for balancing a voltage among the LED strings. For instance, in some embodiments, a constant current regulator circuit 140 can be coupled in a series with the first LED string 120. The constant current regulator circuit 140 can include one or more devices or components for providing a constant current to the first LED string 120. For instance, as will be discussed in more detail below, the constant current regulator circuit 140 can include one or more regulators, resistors, electronic components, control devices, and other components that are configured to provide a constant current output.

As shown in FIG. 1, the constant current regulator circuit 140 is configured to provide a constant current $I_C$ through the first LED string 120. A balance current $I_B$ is provided to the second LED string 130. The magnitude of the balance current $I_B$ is dependent on the constant current $I_C$ provided by the constant current regulator circuit 140 through the first LED string 120. For instance, the balance current $I_B$ can be the remainder of the driver current $I_D$ after providing the constant current $I_C$ through the first LED string 120.

The current provided through the first LED string 120 and the second LED string 130 can be dependent on the output of the constant current regulator circuit 140. For instance, if the constant current $I_C$ output by the constant current regulator circuit 140 is decreased, the balance current $I_B$ can increase. Similarly, if the constant current $I_C$ output by the constant current regulator circuit 140 is increases, the balance current $I_B$ can decrease.

The constant current regulator circuit 140 can provide for voltage balancing between the first LED string 120 and the second LED string 130. For instance, if the voltage demand of the second LED string 130 is greater than the aggregated voltage demand of the first LED string 120, the constant current regulator circuit 140 can absorb the voltage difference in the voltage demands such that voltage of the first LED string 120 and the second LED string 130 is balanced when the first LED string 120 and the second LED string 130 are coupled in parallel.

Figure 2:
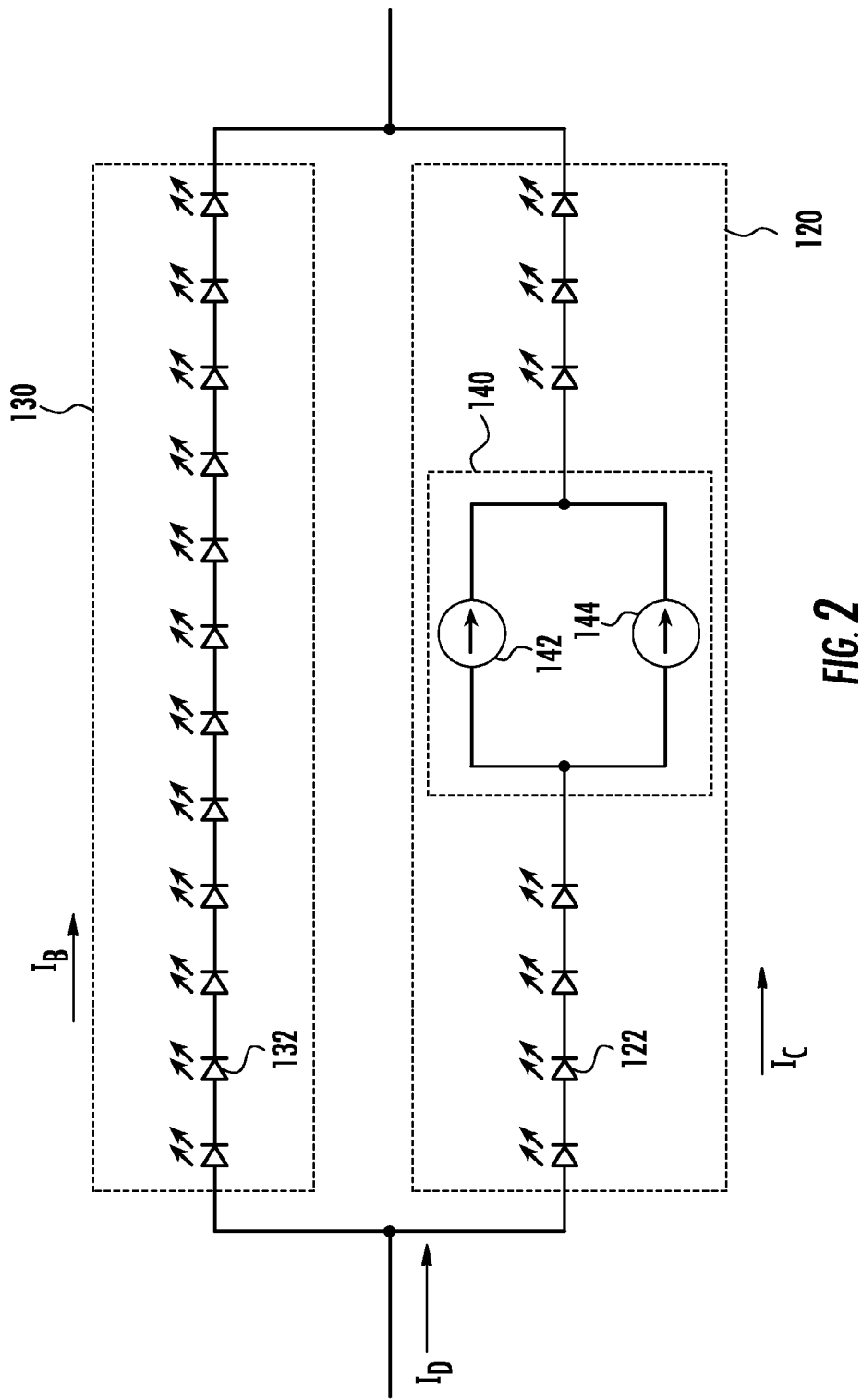
FIG. 2 depicts example LED strings coupled in parallel according to example embodiments of the present disclosure.

FIG. 2 depicts a circuit diagram of one example implementation of parallel LED strings in an LED circuit according to example embodiments of the present disclosure. As shown, the first LED string 120 has a plurality of first LED devices 122 coupled in series. The plurality of first LED devices 122 can be configured to emit light at a particular intensity and/or color, such as a blue color. The second LED string 130 can include a plurality of second LED devices 132 coupled in series. The second LED devices 132 can be configured to emit light at a different intensity and/or color temperature relative to the first LED devices 122. For instance, the second LED devices 132 can be configured to emit light at a red color. As a result, the second LED devices 132 can be associated with different parameters relative to the first LED devices 122, such as different turn-on voltages.

In addition, in the example of FIG. 2, the first LED string 132 includes seven first LED devices 122 in the first LED string 120 and twelve second LED devices 132 in the second LED string 130. Accordingly, the second LED string 130 can require greater voltage requirements to drive the LEDs relative to the first LED string 120. Coupling the first LED string 120 in parallel with the second LED string 130 can result in a voltage imbalance, which can lead to an overvoltage in the first LED string 120.

To balance the voltage of the first LED string 120 and the second LED string 130, the first LED string 120 includes a constant current regulator circuit 140. The constant current regulator circuit 140 can accommodate the additional voltage and can provide a constant current through the first LED string 120. The example constant current regulator circuit 140 includes a first constant current source 142 and a second constant current source 144 coupled in parallel. The first constant current source 142 and second constant current source 144 can be any suitable active current source, such as a constant current diode, Zener diode current source, current source having one or more transistors, op-amp current source, or voltage regulator current source (e.g. LM317 regulator), or other suitable current source.

The first constant current source 142 can provide one half of the constant current $I_C$ through the first LED string 120 and the second constant current source 144 can provide the other half of the constant current $I_C$ through the first LED string 120. A balance current $I_B$ can be provided to the second LED string 130. The balance current $I_B$ can be the remainder of the driver current $I_D$ after providing the constant current $I_C$ through the first LED string 120. While two constant current sources are illustrated in parallel in FIG. 2, those of ordinary skill in the art, using the disclosures provided herein, will understand that more or fewer current sources can be used in the first LED string 120 without deviating from the scope of the present disclosure.

Figure 3:
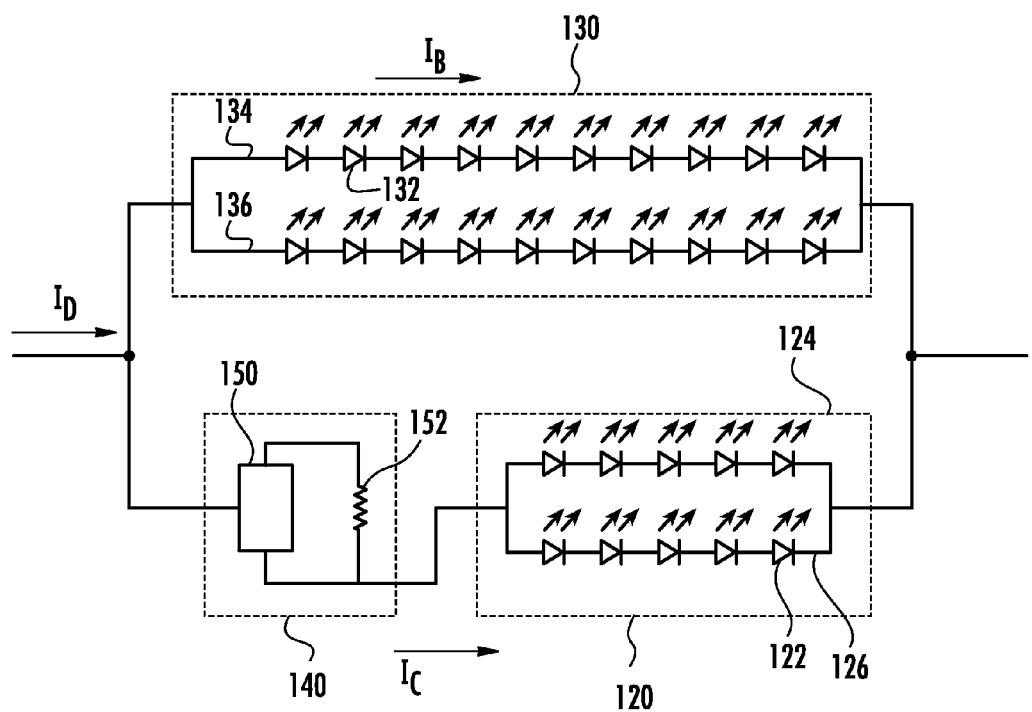
FIG. 3 depicts example LED strings coupled in parallel according to example embodiments of the present disclosure.

FIG. 3 depicts a circuit diagram of another example implementation of parallel LED strings in an LED circuit according to example embodiments of the present disclosure. As shown, the first LED string 120 has a plurality of substrings 122 and 124 coupled in parallel. Each substring 122 and 124 has a plurality of first LED devices 122 coupled in series. Similarly, second LED string 130 has a plurality of substrings 134 and 136 coupled in parallel. Each substring 134 and 136 has a plurality of second LED devices 132 coupled in series. Each LED string 120 and 130 can include a plurality of substrings coupled in parallel to accommodate an increased driver current $I_D$ from a higher powered driver circuit.

The substrings 124 and 126 of the first LED string 120 can be associated with similar voltage demands. For instance, each substring 124 and 126 can include the same number and same semiconductor type of LED devices 122. Similarly, the substrings 134 and 136 of the second LED string 130 can be associated with similar voltage demands For instance, each substring 134 and 136 can include the same number and same type of LED devices 132.

The voltage demands of the first LED string 120 and the second LED string 130, however, may differ as a result of being associated with a different number of LED devices and a different type of LED devices (e.g. with different turn-on voltages). For instance, the first LED string 120 can include two substrings 124, 126 each having five LED devices 122 associated with a turn-on voltage of about 3V. The second LED string 130 can include two substrings 134, 136 each having ten LED devices 132 associated with a turn-on voltage of about 2.1 V. It will be apparent to those skilled in the art, using the disclosure provided herein, that the LED devices could be multiple-junction LED devices and have higher turn-on voltage such as about 6V, 9V, 12V, 18V, 24V, etc. Multiple-junction LED devices can be substituted for a comparable number of single-junction LED devices whose turn-on voltage is usually lower than about 3.5V. As used herein, the use of the term "about" in conjunction with a numerical value is intended to refer to within 25% of the stated numerical value. The first LED devices 122 can be configured to emit light having a blue color while the second LED devices 132 can be configured to emit light having a red color.

To balance the voltage of the first LED string 120 and the second LED string 130, the first LED string 120 includes a constant current regulator circuit 140 configured to provide a constant current $I_C$ through the first LED string 120. The example constant current regulator circuit 140 illustrated in FIG. 3 includes a regulator 150 (e.g. an LM317 regulator or similar device) and a resistor 152. The regulator 130 can maintain a constant voltage drop across the resistor 152 to provide the constant current $I_C$. The magnitude of the voltage drop can be selected to accommodate a difference in voltage demands between the first LED string 120 and the second LED string 130. The magnitude of the constant current $I_C$ can be dependent on the resistance value associated with the resistor 152.

In example embodiments, the constant current regulator circuit 140 of FIG. 3 can be a tunable constant current regulator circuit that can be used to adjust the magnitude of the constant current $I_C$. For instance, the resistor 152 can be replaced or substituted with a different resistor having a different resistance value, causing the constant current $I_C$ to increase or decrease as desired. This in turn can cause an adjustment to the balance current $I_B$ that is provided to the second LED string. As a result, the constant current regulator circuit 140 can be used to control the current supplied to both the first LED string 120 and the second LED string 130.

Figure 4:
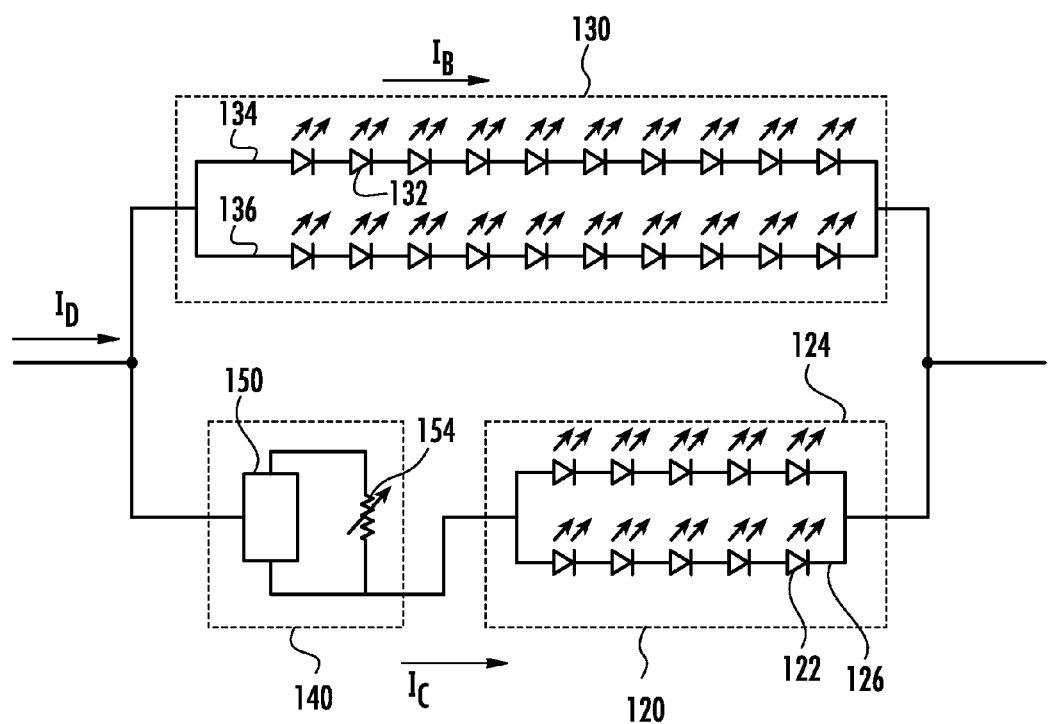
FIG. 4 depicts an example tunable constant current regulator circuit used in conjunction with parallel LED strings according to example embodiments of the present disclosure.

FIG. 4 illustrates an example circuit diagram of an example implementation of parallel LED strings in an LED circuit that is similar to the circuit diagram shown in FIG. 3. The constant current regulator circuit 140 of FIG. 4, however, includes a variable resistor 154. The variable resistor 154 can have an adjustable resistance value. Adjusting the resistance value of the variable resistor 154 can adjust the constant current $I_C$ provided by the constant current regulator 140 to the first LED string 120, which can simultaneously cause an adjustment in the balance current $I_B$ provided to the second LED string 130. In this way, the current ratio between the first LED string 120 and the second LED string 130 can be controlled by adjusting the resistance of the variable resistor 154.

The variable resistor 154 can include any suitable device for adjusting the resistance of the resistor 154, such as a potentiometer. In one embodiment, the variable resistor 154 can be coupled to a manually adjustable element (e.g. a slider, knob, switch, etc.) that can allow for manual adjustment of the variable resistor 154 through movement of the manually adjustable element. In another embodiment, the variable resistor 154 can have an interface configured to receive a variable reference signal. The variable reference signal can be, for instance, a 0V to 10V signal received from an external or internal circuit, such as a dimmer circuit, smart interface control, potentiometer, Zener diode circuit, or other device. Other suitable protocols can be used for the variable reference signal, such as DALI lighting control signal, DMX lighting control signal, or other control signal.

The resistance value of the variable resistor 154 can be adjusted based on the variable reference signal. For instance, as the variable reference signal is adjusted from about 0V to about 5V, the resistance value of the variable resistor 154 can be decreased causing a corresponding increase in the constant current $I_C$ provided by the constant current regulator circuit 140. This can cause a corresponding decrease in the balance current $I_B$ provided to the second LED string 130. In this way, the current ratio of the current provided to the first LED string 120 and the second LED string 130 can be controlled based at least in part on the variable reference signal.

Figure 5:
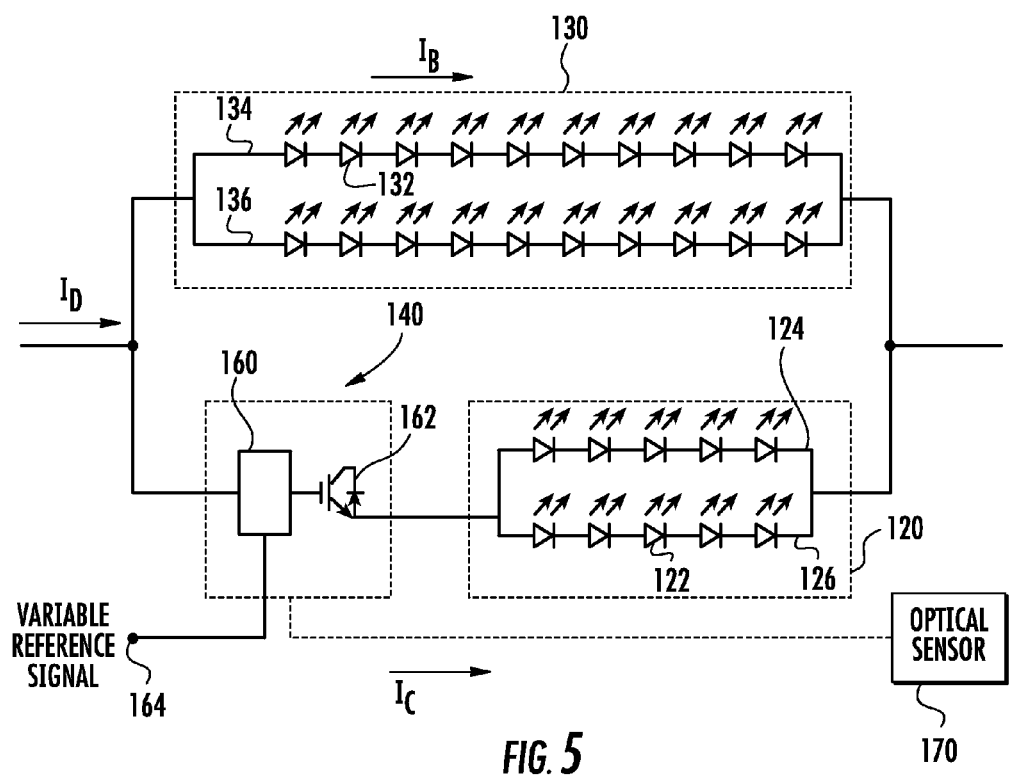
FIG. 5 depicts another example tunable constant current regulator circuit used in conjunction with parallel LED strings according to example embodiments of the present disclosure.

FIG. 5 illustrates an example circuit diagram of an example implementation of parallel LED strings in an LED circuit that is similar to the circuit diagram shown in FIG. 3. The constant current regulator circuit 140 of FIG. 5, however, includes one or more control devices 160 that are configured to control one or more switching elements 162 coupled in series with the first LED string 120 to provide a constant current $I_C$ to the first LED string 120.

The control device(s) 160 can include one or more devices for controlling aspects of the LED circuit, such as one or more microcontrollers, microprocessors, logic devices, integrated circuits, or other control devices. The control device(s) 160 can control the switching of one or more switching elements 162 coupled to the first LED string 120. The switching element(s) 162 can be transistors, such as MOSFET devices. Those of ordinary skill in the art, using the disclosures provided herein, will understand that other switching elements (e.g. other types of transistors) can be used without deviating from the scope of the present disclosure.

The control device(s) 160 can control the switching element(s) 162 by providing gate signals to the switching element(s) 162. For instance, pulse width modulation techniques can be used to control the amount of constant current $I_C$ provided to the first LED string. The switching element(s) 162 can be controlled at an operating frequency that is selected to reduce the presence of flicker in the LED strings as well as to reduce switching losses. For instance, in particular implementations, the switching element(s) 162 can be operated at a frequency in the range of about 100 Hz to 1 kHz.

In particular implementations, the control device(s) 160 can control the switching element(s) 162 to provide a constant current $I_C$ based on a variable reference signal received at an interface 164 to the control device(s) 160. The interface 164 can include one or more components for communicating the variable reference signal to the control device(s) 160. For example, the interface 164 can include one or more circuits, terminals, pins, contacts, conductors, or other components for communicating a variable reference signal to the control device(s) 160.

The variable reference signal can be, for instance, a 0V to 10V signal received from an external or internal circuit, such as a dimmer circuit, smart interface control, potentiometer, Zener diode circuit, or other device. Other suitable protocols can be used for the variable reference signal, such as DALI lighting control signal, DMX lighting control signal, or other control signal.

The current ratio of the current provided to the first LED string 120 and the second LED string 130 can be controlled based at least in part on the variable reference signal. For example, as the variable reference signal is adjusted from about 0V to about 5V, the control device(s) 160 can control the switching element(s) 162 to cause an increase in the constant current $I_C$ provided by the constant current regulator circuit 140 to the first LED string 120. This can cause a corresponding decrease in the balance current $I_B$ provided to the second LED string 130.

As shown in FIG. 5, the LED circuit can optionally include an optical sensor 170 in communication with the constant current regulator circuit 140. The optical sensor 170 can be an ambient color sensor, light sensor, or other device configured to monitor the radiant flux output and/or color of the light emitted by the LED strings 120 and 130. The optical sensor can provide a feedback signal to the constant current regulator circuit 140. The feedback signal can be indicative of the light output of the LED strings 120 and 130.

The control device(s) 160 can be configured to control the constant current $I_C$ based at least in part on the feedback signal. For instance, if the light output varies from a desired light output, the control device(s) 160 can make adjustments to the constant current $I_C$ provided to the first LED string 120. This can cause a corresponding change in the balance current $I_B$ provided to the second LED string 130 to achieve the desired light output.

The present disclosure has been discussed with reference to two LED strings coupled in parallel for purposes of illustration and discussion of example embodiments of the present disclosure. Those of ordinary skill in the art, using the disclosures provided herein, will understand that LED circuits according to example aspects of the present disclosure can include more than two LED strings coupled in parallel without deviating from the scope of the present disclosure.

Figure 6:
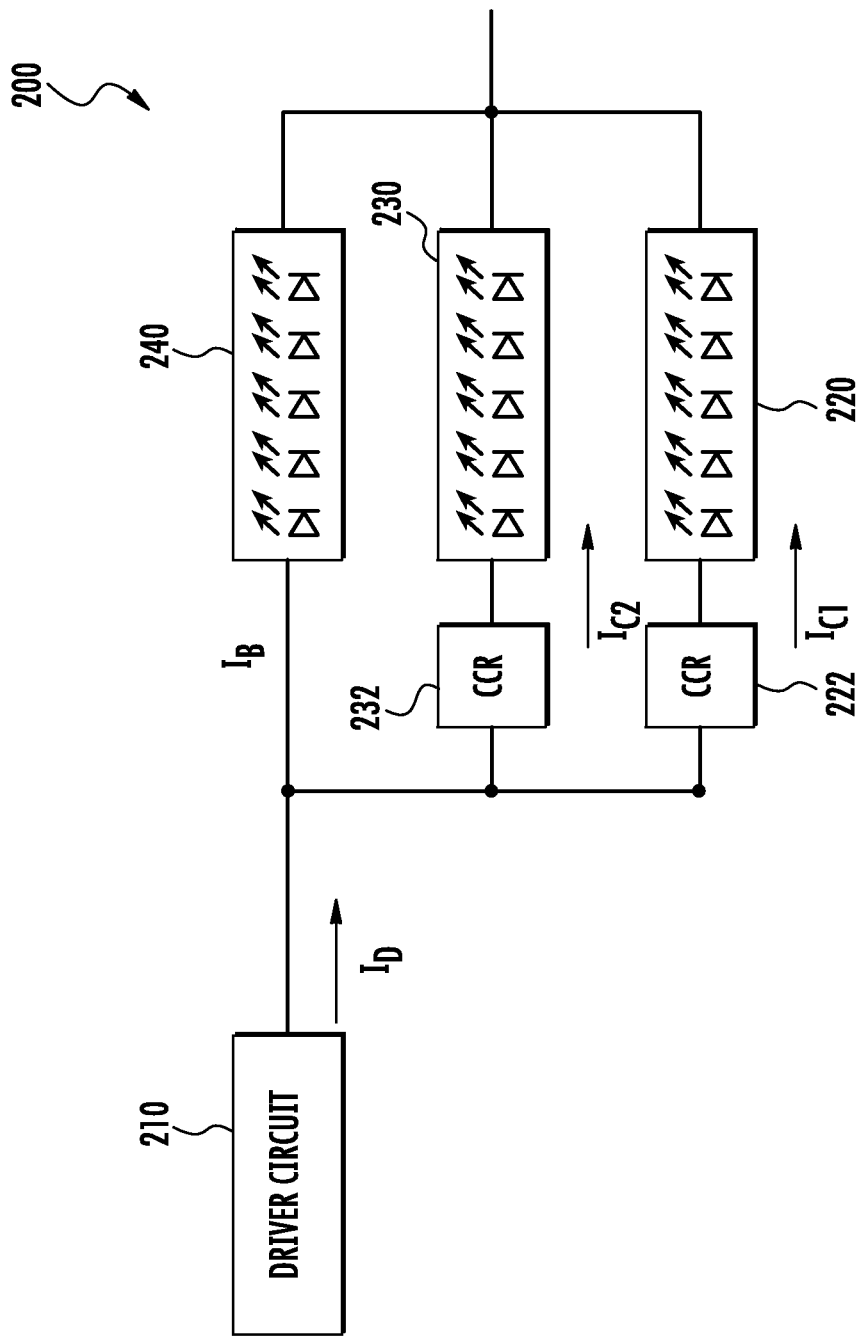
FIG. 6 depicts an example LED circuit according to example embodiments of the present disclosure.

For instance, FIG. 6 depicts an example LED circuit 200 according to another example embodiment of the present disclosure. The LED circuit 200 includes three LED strings coupled in parallel, including a first LED string 220, a second LED string 230, and a third LED string 240. A driver circuit 210 (e.g. a dimmable driver circuit) can be configured to provide a driver current $I_D$ to the plurality of LED strings. Each of the first LED string 220, the second LED string 230, and the third LED string 240 can have different voltage demands as a result of the different characteristics of the LED devices used in the respective LED strings.

The first LED string 220 can include a first constant current regulator circuit 222 configured to provide a constant current $I_{C1}$ to the first LED string 220. The second LED string 230 can include a second constant current regulator circuit 232 configured to provide a constant current $I_{C2}$ to the second LED string 230. The first constant current regulator circuit 222 and the second constant current regulator circuit 232 can be any of the example constant current regulator circuits disclosed herein, including a tunable constant current regulator circuit. A balance current $I_B$ can be provided to the third LED string 240. The balance current $I_B$ can be the portion of the driver current $I_D$ remaining after providing the first constant current $I_{C1}$ to the first LED string 220 and the second constant current $I_{C2}$ to the second LED string 230. In this way, the current provided to all of the LED strings 220, 230, and 240 can be controlled by actively regulating the current in a subset of the LED strings, namely the first LED string 220 and the second LED string 230.

Figure 7:
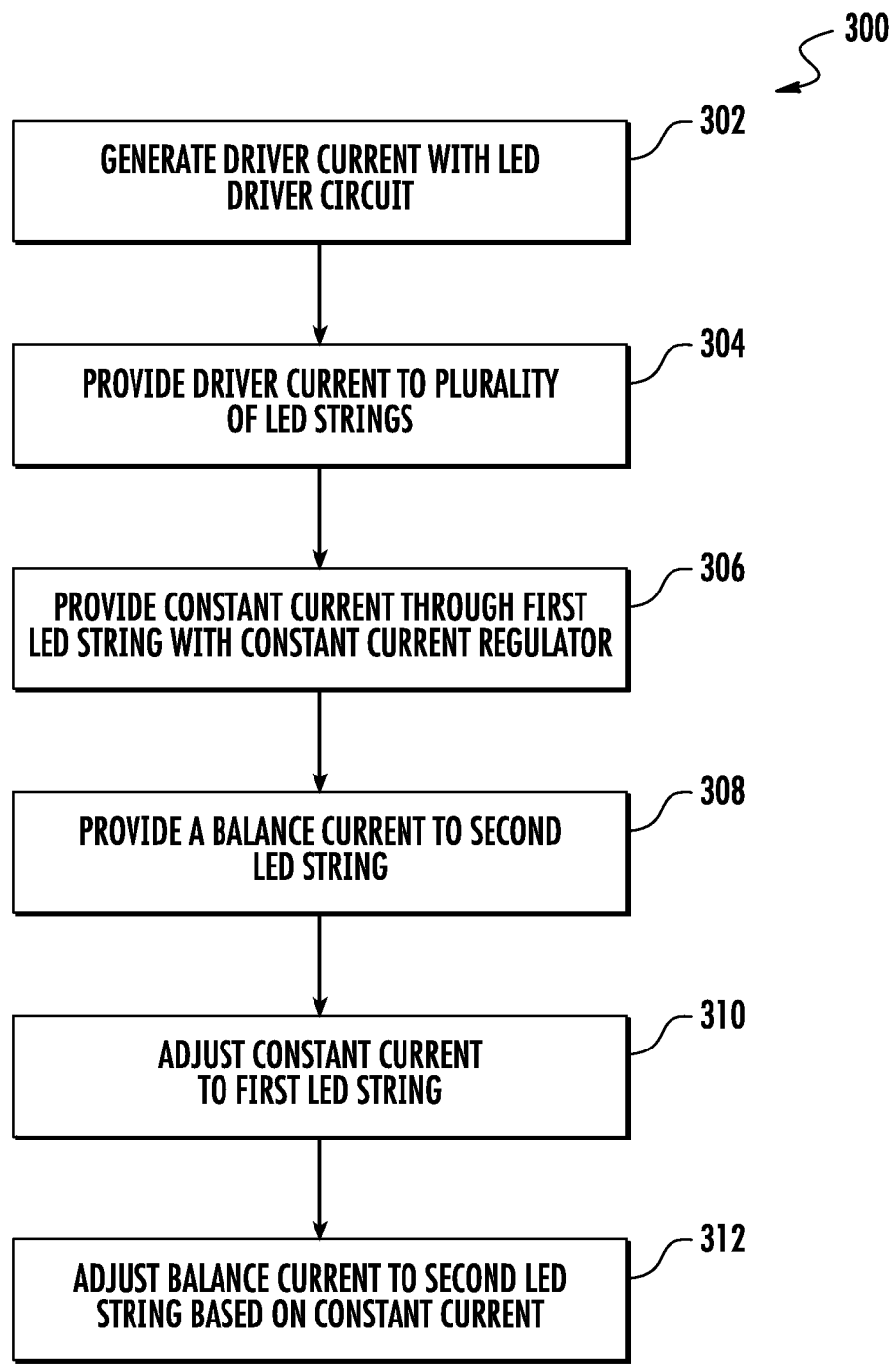
FIG. 7 depicts a flow diagram of an example method for providing current in an LED circuit according to example embodiments of the present disclosure.

FIG. 7 depicts an example method (300) for providing current in an LED circuit according to example aspects of the present disclosure. FIG. 7 can be implemented using any suitable LED circuit, such any of the LED circuits illustrated in FIGS. 1-6. In addition, FIG. 7 depicts steps performed in a particular order for purposes of illustration and discussion. Those of ordinary skill in the art, using the disclosures provided herein, will understand that various steps of any of the methods disclosed herein can be adapted, expanded, omitted, rearranged, or modified in various ways without deviating from the scope of the present disclosure.

At block (302), the method can include generating a driver current with an LED driver circuit. For instance, an input AC or DC power received from a power source can be converted by the driver circuit to a suitable driver current for powering a plurality of LED devices. At block (304), the driver current is provided to a plurality of LED strings coupled in parallel. For instance, a driver current $I_D$ can be provided to a first LED string 120 and a second LED string 130 (shown in FIG. 1) coupled in parallel. The first LED string 120 can have a different voltage demand relative to the second LED string 130.

At block (306), the method can include providing a constant current through the first LED string using a constant current regulator circuit. For instance, a constant current regulator circuit 140 (shown in FIG. 1) can provide a constant current $I_C$ to the first LED string 120. The constant current regulator circuit can also balance the voltage associated with the parallel LED strings such that the constant current regulator circuit accommodates any difference in voltage demands between the parallel LED strings.

At block (308), a balance current is provided to the second LED string. The balance current can be the portion of the driver current remaining after the constant current is provided to the first LED string. For instance, as shown in FIG. 1, the balance current $I_B$ provided to the second LED string 130 can be the portion of the driver current $I_D$ remaining after the constant current $I_C$ is provided to the first LED string 120.

At block (310), the method can include adjusting the constant current to the first LED string. For instance, a tunable constant current regulator circuit 140 can be used to adjust the constant current $I_C$ provided to the first LED string120. The constant current can be adjusted, for instance, based on a variable reference signal used to adjust a resistance associated with the constant current regulator circuit. In addition and/or in the alternative, the constant current can be adjusted using one or more control devices based at least in part on a variable reference signal.

At block (312), the method can include adjusting the balance current to the second LED string based at least in part on the adjusted constant current provided by the constant current regulator circuit. For instance, an increase in the constant current $I_C$ provided to the first LED string 120 (shown in FIG. 1) can cause a corresponding decrease in the balance current provided $I_B$ provided to the second LED string 130. Similarly, a decrease in the constant current $I_C$ provided to the first LED string 120 can cause an increase in the balance current $I_B$ provided to the second LED string 130. In this way, the constant current regulator circuit according to example aspects of the present disclosure can be used to balance the voltage among the plurality of parallel LED strings as well as to control the current ratio among the plurality of parallel LED strings.

Figure 8:
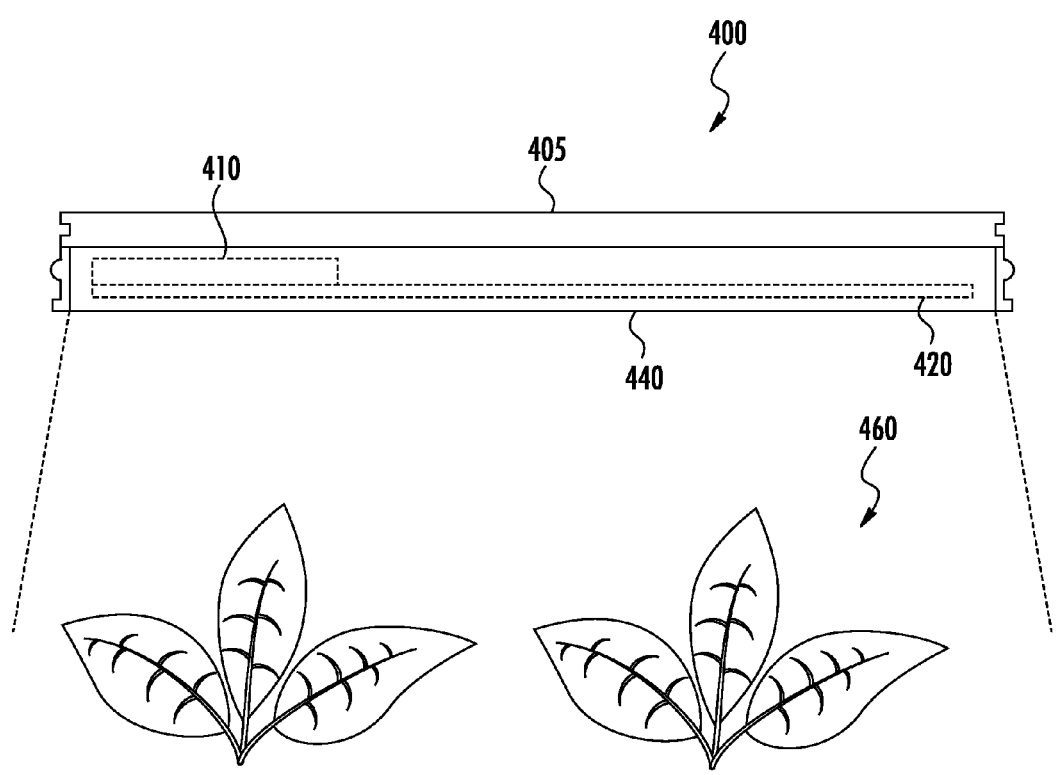
FIG. 8 depicts an example LED lighting unit according to example embodiments of the present disclosure.

FIG. 8 depicts an example LED lighting unit 400 that can include an LED circuit according to example embodiments of the present disclosure. The LED lighting unit 400 can include a housing 405 used to house and protect various components of the LED lighting unit. The housing 405 can be constructed of any suitable material, such as anodized aluminum, steel, or plastic.

The LED lighting unit 400 can include a driver circuit 410 and an LED board 420 located within the housing 405. The driver circuit 410 can be configured to receive an input AC or DC power from a power source and convert the input power to a driver current for powering a plurality of LED devices located on the LED board 420. The LED board 420 can be a printed circuit board including an LED circuit having parallel LED strings according to example embodiments of the present disclosure.

The LED lighting unit 400 can include a lens 440 and various optics to deliver light emitted by the LED devices on the LED board 420. The lens 440 can be, for instance, a glass, polycarbonate, acrylic, or silicone lens (with or without UV protection) or other suitable lens. As demonstrated in FIG. 8, the LED lighting unit 400 can be suitable for horticultural applications where the lighting unit 400 is configured to provide light for use by vegetation 460.

For example, the LED board 420 can include a first LED string having a plurality of LED devices coupled in series and configured to provide blue light (e.g. light having a wavelength in the range of about 400 to 500 nm) at a first intensity (e.g. about 17 micromoles). The LED board 420 can further include a second LED string having LED devices coupled in series and configured to provide red light (e.g. light having a wavelength in the range of about 600 to 750 nm) at a second intensity (e.g. about 80 micromoles).

The first LED string can be associated with a different voltage demand relative to the second LED string as a result of the different light output requirements of the first LED string and the second LED string. Accordingly, the LED circuit implemented on LED board 420 can include a constant current regulator circuit used to balance the voltage of the first LED string and the second LED string as discussed with reference to the example embodiments of the present disclosure disclosed herein.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A lighting emitting diode (LED) circuit, comprising:
    a driver circuit comprising one or more switching elements, the driver circuit configured to provide a controlled driver current using the one or more switching elements;
    a first LED string having one or more first LED devices;
    a second LED string having one or more second LED devices, the first LED string and the second LED string being coupled in parallel;
    wherein the first LED string comprises a constant current regulator circuit configured to provide a constant current to the first LED string such that a balance current is provided to the second LED string, the balance current being at least a portion of the controlled driver current remaining after the constant current is provided to the first LED string.

2. The LED circuit of claim 1, wherein the plurality of second LED devices of the second LED string are associated with a greater voltage demand relative to the plurality of first LED devices of the first LED string.

3. The LED circuit of claim 2, wherein the constant current regulator circuit balances a voltage associated with the first LED string and the second LED string.

4. The LED circuit of claim 2, wherein the first LED string has less LED devices than the second LED string.

5. The LED circuit of claim 2, wherein the first LED devices are associated with a turn-on voltage that is different from a turn-on voltage associated with the second LED devices.

6. The LED circuit of claim 1, wherein the first LED string comprises a plurality of first substrings coupled in parallel, each first substring comprising one or more LED devices, the constant current regulator circuit being coupled in series with the plurality of first substrings coupled in parallel.

7. The LED circuit of claim 1, wherein the constant current regulator circuit is a tunable constant current regulator circuit.

8. The LED circuit of claim 7, wherein the tunable constant current regulator circuit comprises a variable resistor, the first current provided to the first LED string being adjustable based at least in part on a resistance value associated with the variable resistor.

9. The LED circuit of claim 7, wherein the tunable constant current regulator circuit comprises a control device configured to regulate the first current provided to the first string.

10. The LED circuit of claim 9, wherein the tunable constant current regulator circuit is configured to control the first current based at least in part on a variable reference signal.

11. The LED circuit of claim 9, wherein the LED circuit is coupled to an optical sensor, the optical sensor configured to provide a feedback signal indicative of a light output of the first LED string and second LED string, the control device configured to control the first current based at least in part on a feedback signal.

12. The LED circuit of claim 1, wherein the first LED devices are configured to provide light at a different color or intensity relative to the second LED devices.

13. The LED circuit of claim 1, wherein the LED circuit is part of an LED lighting unit for a horticultural application.

14. A method for providing current to a plurality of light emitting diode (LED) devices, comprising:
    generating a controlled driver current at a driver circuit based at least in part on a dimming control signal, the driver circuit comprising one or more switching elements used to control the controlled driver current;
    providing the driver current to a plurality of LED strings coupled in parallel, each of the plurality of LED strings comprising a plurality of LED devices coupled in series;
    providing a constant current through one or more of the plurality of LED strings using one or more constant current regulator circuits;
    providing a balance current to at least one of the plurality of LED strings, the balance current being at least a portion of the controlled driver current remaining after the constant current is provided to the one or more of the plurality of LED strings.

15. The method of claim 14, wherein the method comprises:
    adjusting the constant current provided to the one or more of the plurality LED strings using a tunable constant current regulator circuit.

16. The method of claim 15, wherein adjusting the constant current comprises adjusting a resistance value associated with one or more resistors.

17. The method of claim 15, wherein adjusting the constant current comprises adjusting a variable reference signal used to control the tunable constant current regulator circuit.

18. A light emitting diode (LED) system, comprising:
    a dimmable driver circuit comprising one or more switching elements, the dimmable driver circuit configured to provide a controlled driver current using the one or more switching elements;
    a first LED string having one or more first LED devices;
    a second LED string having one or more second LED devices, the first LED string and the second LED string being coupled in parallel;
    wherein the first LED devices are configured to provide light at a different color or intensity relative to the second LED devices such that the plurality of second LED devices of the second LED string are associated with a greater voltage demand relative to the plurality of first LED devices of the first LED string;
    wherein the first LED string comprises means for balancing a voltage associated with the first LED string and the second LED string.

19. The LED system of claim 18, wherein the means for balancing a voltage associated with the first LED string and the second LED string comprises a constant current regulator.

* * * * *